(12) United States Patent
Yerges

(10) Patent No.: US 11,364,607 B2
(45) Date of Patent: Jun. 21, 2022

(54) BEARING REMOVAL TOOL

(71) Applicant: Logan Yerges, Oak Creek, WI (US)

(72) Inventor: Logan Yerges, Oak Creek, WI (US)

(73) Assignee: Logan Yerges, Oak Creek, WI (US)

( * ) Notice: Subject to any disclaimer, the term of this patent is extended or adjusted under 35 U.S.C. 154(b) by 0 days.

(21) Appl. No.: 17/327,157

(22) Filed: May 21, 2021

(65) Prior Publication Data

US 2022/0063070 A1 Mar. 3, 2022

Related U.S. Application Data

(60) Provisional application No. 63/073,632, filed on Sep. 2, 2020.

(51) Int. Cl.
*B25B 27/06* (2006.01)
*B25B 27/00* (2006.01)
*F16C 35/06* (2006.01)

(52) U.S. Cl.
CPC .......... *B25B 27/06* (2013.01); *B25B 27/0035* (2013.01); *F16C 35/062* (2013.01)

(58) Field of Classification Search
CPC ..... B25B 27/06; B25B 27/0035; B25B 27/14; B25B 27/0028; B25B 27/062; B25B 27/023; Y10T 29/53552; Y10T 29/53596; Y10T 29/53657; Y10T 29/53848; Y10T 29/53857; Y10T 29/53865; F16C 35/06; F16C 35/062; F16C 35/063; F16C 35/0635; F16C 35/07; F16C 35/073; F16C 35/077; F16C 35/078

USPC ........................ 29/238, 239, 426.5, 263, 802
See application file for complete search history.

(56) References Cited

U.S. PATENT DOCUMENTS 3,549,219 A * 12/1970 Mowbray ............... F16C 33/76
384/460

OTHER PUBLICATIONS

Author: Flat Rate Master Title: Bearing Race Removal The Flat Rate Method Publication Date: Jul. 18, 2018 URL: https://www.youtube.com/watch?v=ZPe4R8VqE5A (Year: 2018).*

* cited by examiner

*Primary Examiner* — Lee D Wilson
*Assistant Examiner* — Alberto Saenz
(74) *Attorney, Agent, or Firm* — Boyle Fredrickson, S.C.

(57) ABSTRACT

The present invention relates to a tool for expediting the separation of different components of a wheel hub. The tool includes a base and a top that is rotatably connected to the base. The tool may also include a bearing that is connected to the base and to the top, where the bearing enables the rotation of the top relative to the base. A portion of a wheel hub may be located relative to the top, after which the wheel hub and top can be rotated. While this occurs, a heat source can be applied to a portion of the wheel hub to enable even heating. As a result of this heating and related expansion, a first wheel hub piece may be separated from a second wheel hub piece.

20 Claims, 6 Drawing Sheets

BEARING REMOVAL TOOL

CROSS-REFERENCE(S) TO RELATED APPLICATION(S)

This application claims the benefit of priority on U.S. Provisional Patent Application Ser. No. 63/073,632, filed on Sep. 2, 2020 and entitled Bearing Removal Tool, the entirety of which is hereby incorporated by reference.

BACKGROUND OF THE INVENTION

1. Field of the Invention

The present invention relates in general to the field of wheel bearings. More particularly, the present invention relates to a tool used to simplify and expedite the removal of an inner race of a wheel bearing relative to a wheel hub when the wheel bearing needs to be replaced. Even more specifically, the present invention is directed to a tool that allows the inner race of the wheel bearing to be displaced from the wheel hub quickly and easily.

2. Discussion of the Related Art

As is known to those skilled in the art, it can be difficult to separate different components associated with a wheel bearing from one another. For instance, when replacing worn out or noisy wheel bearings, a mechanic would need to pound the wheel hub out of the steering knuckle in order to gain access to the press-in wheel bearing using a hammer, mallet, or other tool using brute force. More specifically, a wheel hub may be pounded such that an inner race of the bearing stays lodged onto the hub denying the bearing to be replaced making removal necessary. In doing so, there is risk that the hub can also be damaged. Otherwise, metal fingers may be used to grip the race and hammer it off. Further still, a blunt chisel bit may be used to force the piece off while trying not to damage or score the hub assembly surface. Another option would be to cut off the race.

What is therefore needed is a tool that remedies any of the issues outlined above. What is further needed therefore is a tool that can quickly and easily separate the various components of a wheel hub.

SUMMARY AND OBJECTS OF THE INVENTION

By way of summary, the present invention is directed to a tool for expediting the separation of a wheel hub. The tool may include a base that is secured in place and a top that is rotatably connected to the base. For instance, the base may be secured in place by a bench vice. Further still, the base may include a plurality of flat sections that are configured to be gripped by the bench vice. At least a portion of the wheel hub may engage with the top, and the wheel hub may be rotated relative to the base. When this occurs, a heat source may be applied to a portion of the wheel hub to separate a first wheel hub piece from a second wheel hub piece.

According to an aspect of the present invention, the invention may further comprise a bearing. For instance, the bearing may be connected to both the base and the top. More specifically, the bearing may have a press-fit connection with both the base and the top, simplifying the assembly process of the tool. The bearing may allow the top to be rotated relative to the bottom.

According to another aspect of the invention, the top may be a tapered cone. Further still, the wheel hub may be rested on the tapered cone. Thereafter, the tapered cone and the wheel hub may be rotated relative to the base. While this occurs, an inner race of the wheel hub may be heated evenly, resulting in proper expansion while the tapered cone and wheel hub are rotated relative to the base.

According to another aspect of the invention, a method of using a tool for expediting the separation of a wheel hub is provided. This method can include securing a base in place, placing at least a portion of a wheel hub on a top that is rotatably connected to the base, rotating the wheel hub and the top relative to the base, and applying a heat source to a portion of the wheel hub. The method may also include the step of spinning the wheel hub and the top relative to the base using a bearing. Further still, the method may include the steps of pressing the bearing against the top and pressing the bearing against the base. Additionally, the method may include the step of securing the base in place by a bench vice. For instance, the base may be secured by a bench vice that engages with a plurality of flat sections of the base. The method may also include the steps of resting the wheel hub on a tapered cone that is the top and rotating the tapered cone and the wheel hub relative to the base. Further still, the method may include the steps of rotating the tapered cone and wheel hub relative to the base and heating an inner race of the wheel hub evenly for proper expansion.

These, and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

Figure 1:
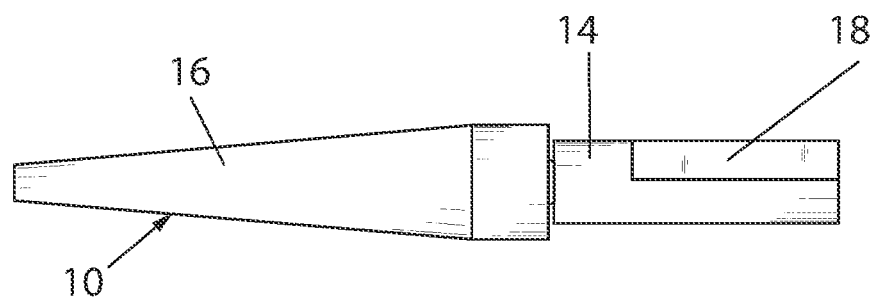
FIG. 1 illustrates a side elevation view of a tool used to disengage portions of a wheel bearing.
Figure 2:
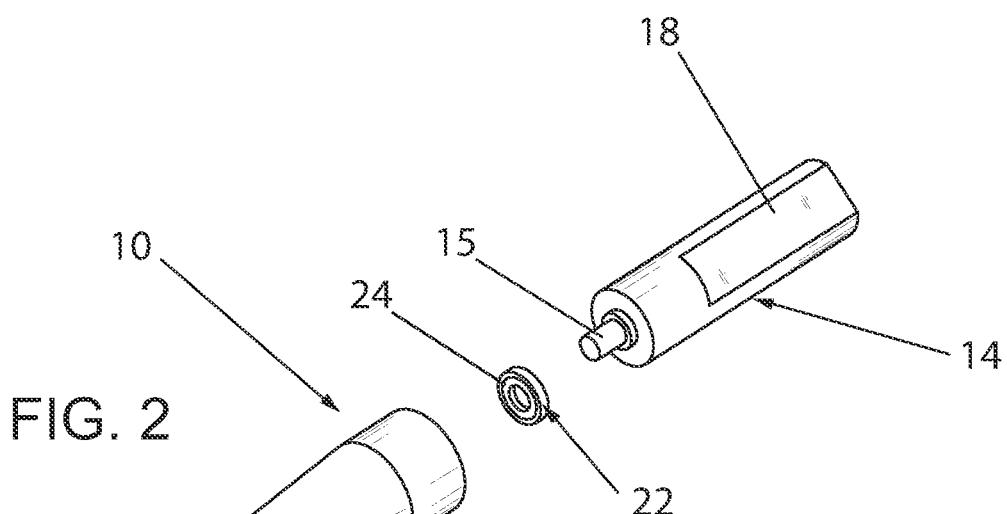
FIG. 2 is an exploded perspective view of the tool of FIG. 1.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words connected, attached, or terms similar thereto are often used. They are not limited to direct connection but include connection through other elements where such connection is recognized as being equivalent by those skilled in the art.

DESCRIPTION OF PREFERRED EMBODIMENTS

The present invention and the various features and advantageous details thereof are explained more fully with reference to the non-limiting embodiments described in detail in the following description.

Figure 3:
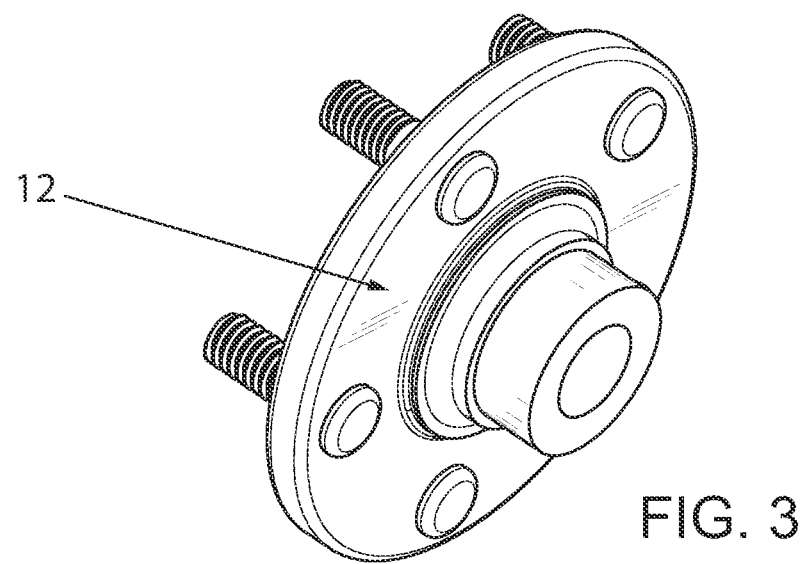
FIG. 3 is a perspective view of a wheel bearing.
Figure 7:
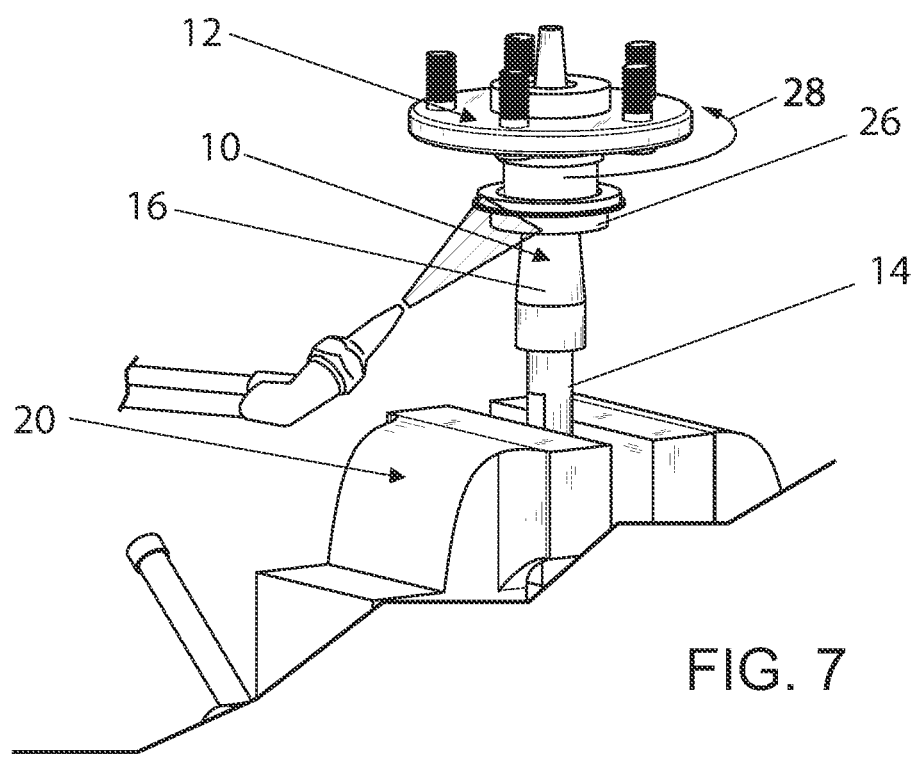
FIG. 7 is a perspective view of the tool in use where the wheel bearing is spun and the heat source is applied once the race moves further down the tool.
Figure 8:
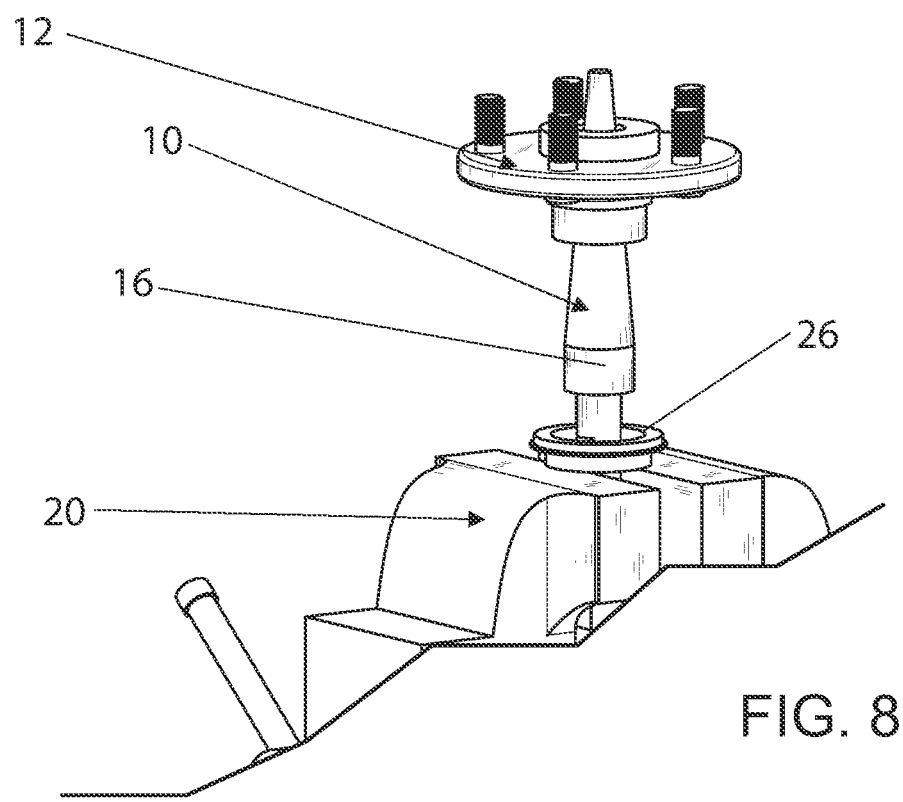
FIG. 8 is a perspective view of the tool in use where race has fully been removed.
Figure 9:
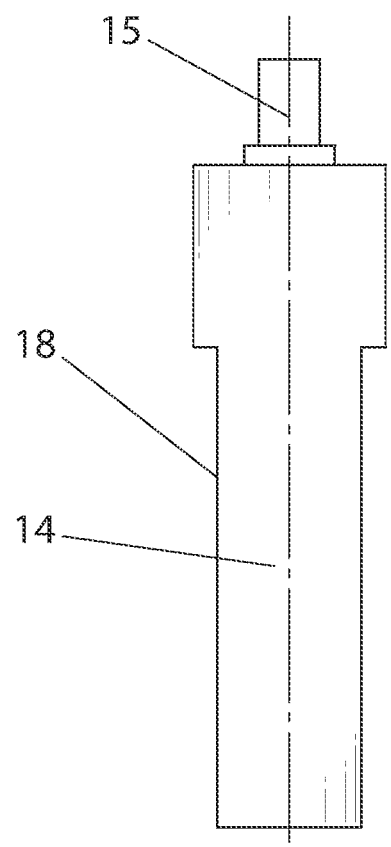
FIG. 9 shows a side elevation view of the base.

Referring now to FIGS. 1, 2, and 4-11, an inventive tool 10 is shown that is used to expedite the separation of various components of a wheel hub 12 as shown in FIG. 3. More specifically, the tool 10 includes a base 14 and a top 16 that is rotatable relative to the base 14. As shown, the base 14 is substantially cylindrical in shape. Additionally, the base 14 may have various sections 18 that are substantially flat, as shown in FIG. 9. These sections 18 allow the base 14 to easily be held in place by other tooling, for instance, as shown in FIGS. 4-8, by a bench vice 20. Of course, the base 14 could take any number of other shapes as known to one having ordinary skill in the art. Additionally, the base 14 may have a shaft 15 extending therefrom.

Figure 10:
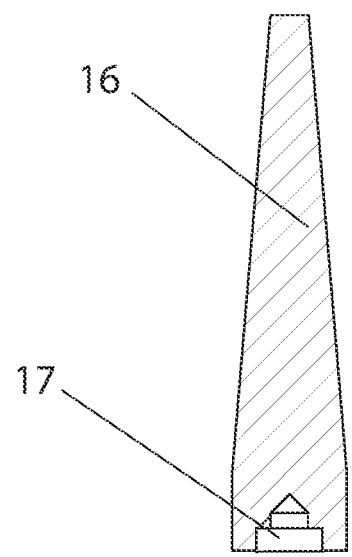
FIG. 10 shows a cutaway side elevation of the top.
Figure 11:
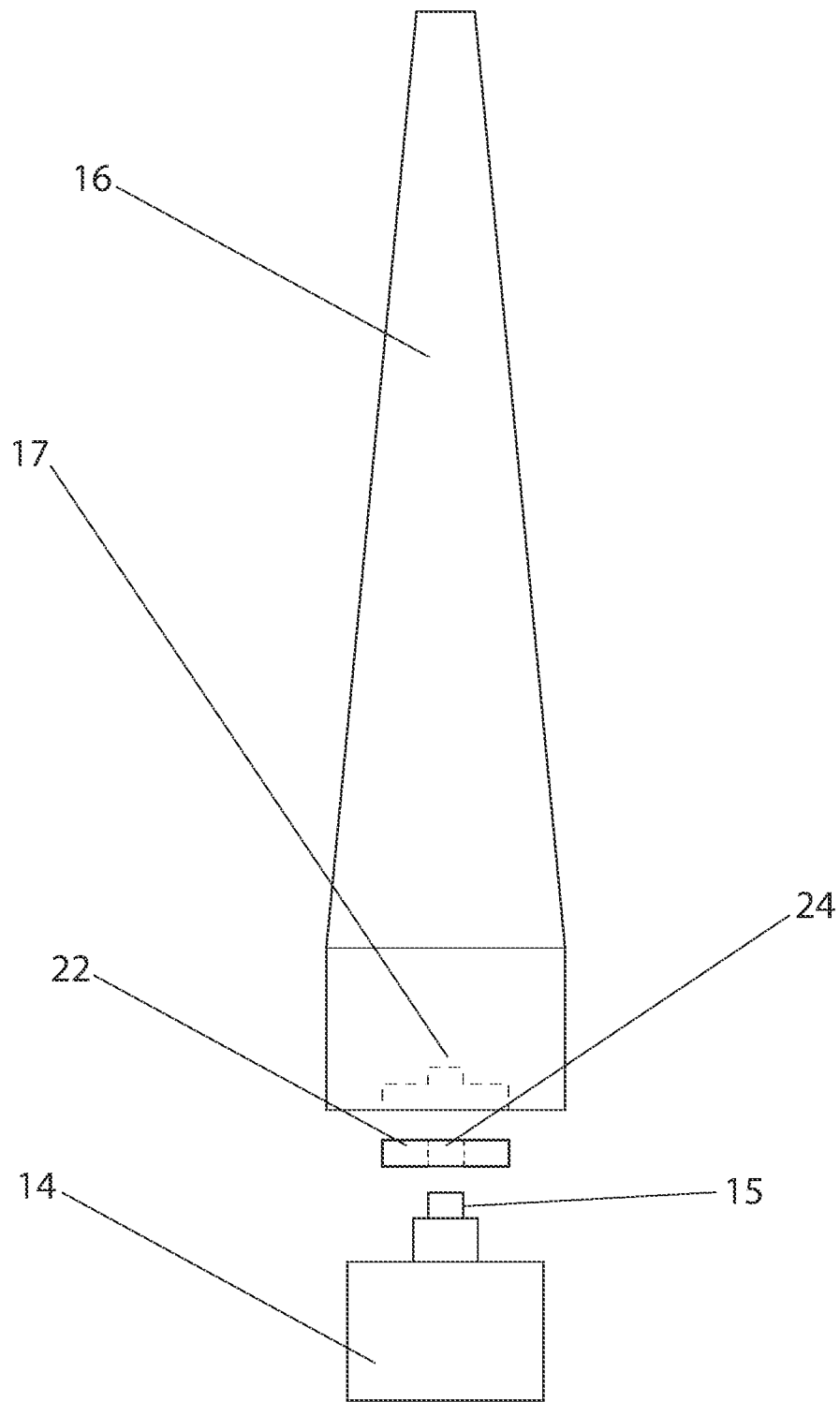
FIG. 11 shows another exploded elevation view of the tool with the interior features shown in phantom.

As shown for instance in FIG. 10, the top 16 may be in the shape of a tapered cone, although again, the top 16 could be in any other shape as known to those having ordinary skill in the art. The top 16 may have an opening 17 formed at its bottom. For instance, the opening 17 may be configured to receive a bearing 22 described below, and a portion of the base 14 such as the shaft 15. The wheel hub 12 may be engaged with a portion of the tapered cone top 16. Once the wheel hub 12 is engaged with a portion of the tapered cone top 16, the wheel hub 12 and the top 16 may be rotated relative to the base 14. While this occurs, heat can be applicated to the wheel hub 12 as will further be described below.

In addition to the base 14 and the top 16, the tool may also include a bearing 22. As shown, the bearing is a 608 style roller bearing, although other bearings could similarly be used to achieve the same goal. The bearing 22 may be connected to both the base 14 and the top 16. More specifically, the bearing 22 may be configured to enable a press-fit connection with both the base 14 and the top 16. For instance, the shaft 15 may be inserted into an interior opening 24 of the bearing 22. Additionally, the bearing 22 may be nested within the opening 17. This can simplify the assembly of the tool 10, where other tools or fasteners are not required. Rather, the base 14 and the top 16 can simply be pressed against the bearing 22 to form a connection. The bearing 22 allows the top 16 to spin freely while the wheel hub 12 is heated.

Figure 4:
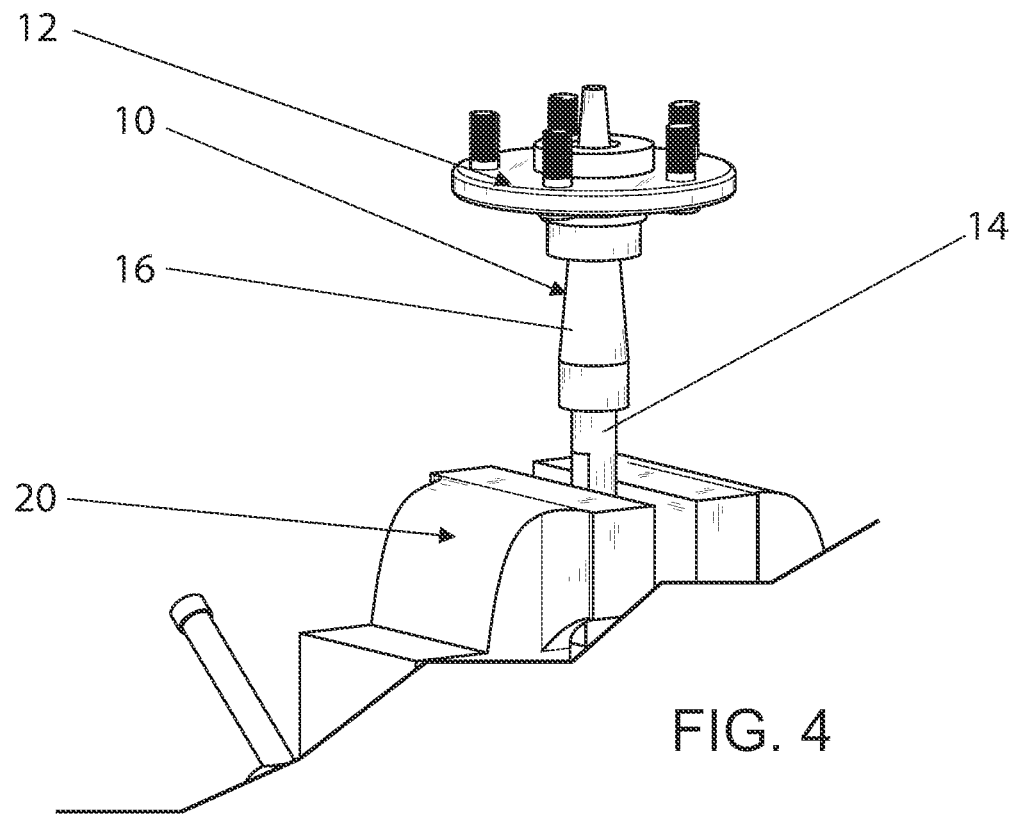
FIG. 4 is a perspective view of the tool in use with the wheel bearing resting on the tool.
Figure 5:
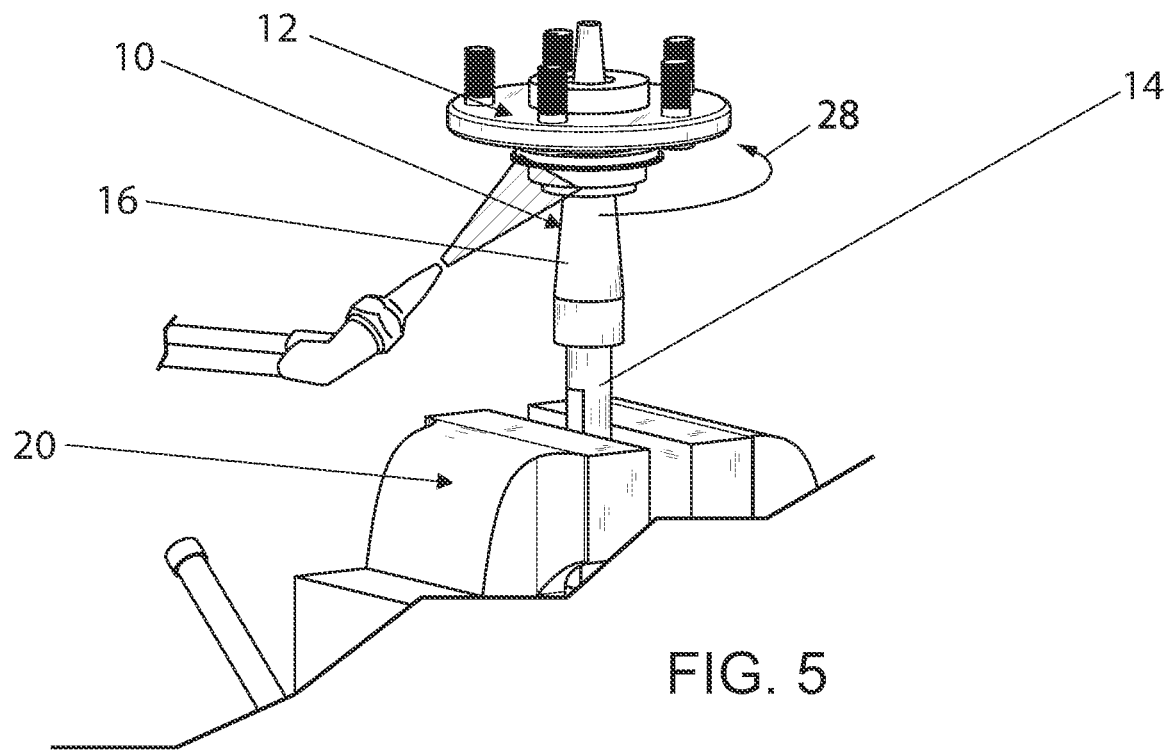
FIG. 5 is a perspective view of the tool in use where the wheel bearing is spun and a heat source is initially applied.
Figure 6:
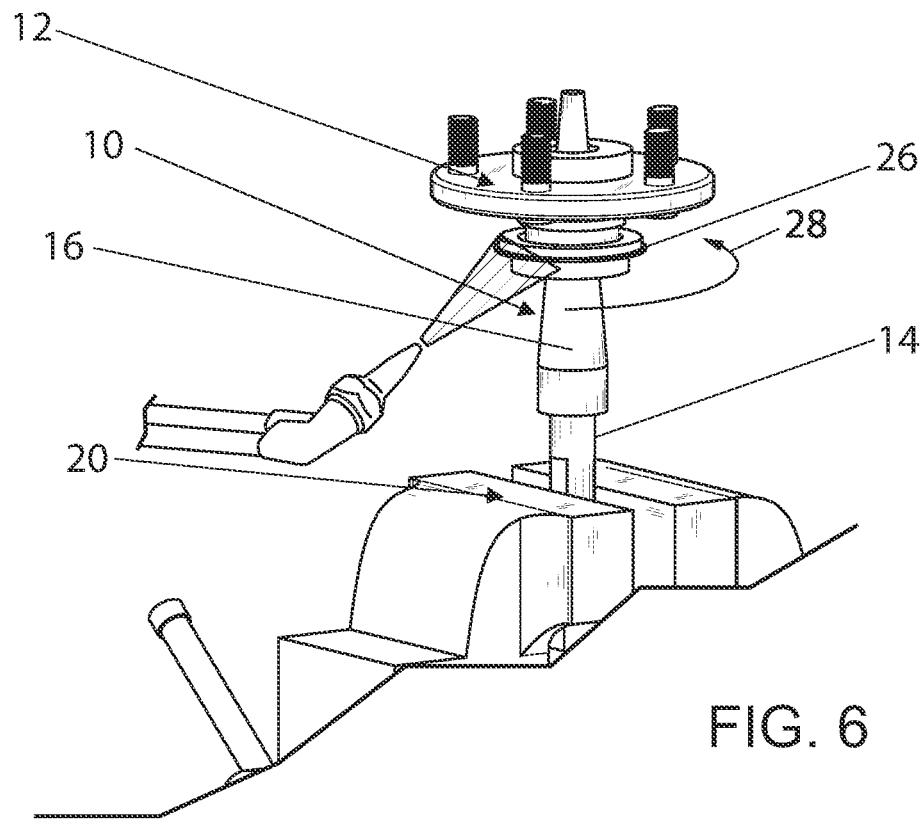
FIG. 6 is a perspective view of the tool in use where the wheel bearing is spun and the heat source is applied once a race begins to move down the tool.

Operation of the tool 10 will now be described. Worn out and noisy wheel hubs and specific components related thereto such as the inner race 26 may need to be replaced from time to time. Traditionally, this work has been completed by manually removing the portion of the wheel hub, whether that be using a slide hammer with metal fingers, an air hammer with a chisel bit, or other devices to cut the various components up. Unfortunately, use of these methods can damage or destroy other components in the process. Additionally, these methods can also take significant time, and result in excessive noise. The present tool 10 addresses these issues, in that it can be used to successfully separate the various components without damaging the hub, while also doing so quickly and quietly. More specially, tool 10 is secured in place, for instance, by the securing the base 14 in place. As shown in FIG. 4, this is achieved using a bench vice 20. Thereafter, the wheel hub 12 may be mounted to the top 16, as shown, a cone-shaped top 16, as also shown in FIG. 4. Thereafter, the top 16 and the wheel hub 12 are rotated by spinning the top 16 relative to the base 14, with the rotation movement shown as reference 28. While this occurs, a heat source is applied, as shown in FIG. 5. Because of this spinning motion, heat is applied evenly to the entire inner race. As the inner race 26 is heated, it slides down the top 16 along the tapered cone, as shown in FIGS. 6-8. Thereafter, the wheel hub 12 can be removed from the top, and replacement pieces may be installed.

While the present tool 10 is described to be used with a wheel hub 12, it should be appreciated that the tool 10 could similarly be used with any number of different pieces of equipment in order to enable spinning of the equipment in order to apply consistent heat to the piece of equipment. The tool 10 is particularly equipped to apply heat to a circular piece of equipment, although it could similarly be used on any other pieces of equipment.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

Moreover, the illustrations provide an exemplary tool, and the individual components need not be formed in the disclosed shapes, or assembled in the disclosed configuration, but could be provided in virtually any shape, and assembled in virtually any configuration. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended claims.

What is claimed is:

1. A tool for expediting the separation of a wheel hub comprising:
   a base;
   a top rotatably connected to the base; and
   a bearing connected to the base and the top;
   wherein at least a portion of the wheel hub engages with the top;
   wherein the wheel hub is rotated relative to the base;
   wherein a heat source is applied to a portion of the wheel hub to separate a first wheel hub piece from a second wheel hub piece; and
   wherein the bearing allows the top to be rotated relative to the base.

2. The tool of claim 1, wherein the base is secured in place by a bench vice.

3. The tool of claim 2, wherein the base further comprises a plurality of flat sections configured to be gripped by the bench vice.

4. The tool of claim 1, wherein the top comprises a tapered cone.

5. The tool of claim 4, wherein the wheel hub is rested on the tapered cone; and
wherein the tapered cone and the wheel hub are rotated relative to the base.

6. The tool of claim 5, wherein an inner race of the wheel hub is heated evenly while the tapered cone and wheel hub are rotated relative to the base.

7. The tool of claim 1, wherein the bearing is press-connected to the base; and
wherein the bearing is press-connected to the top.

8. The tool of claim 1, wherein the bearing is a 608 style roller bearing.

9. A method of using a tool for expediting separation of a wheel hub comprising the steps of:
securing a base;
placing at least a portion of a wheel hub on a top that is connected to the base;
rotating the wheel hub and the top relative to the base using a bearing; and
applying a heat source to a portion of the wheel hub.

10. The method of claim 9, further comprising the steps of:
pressing the bearing against the top; and
pressing the bearing against the base.

11. The method of claim 9, further comprising the step of securing the base in place by a bench vice.

12. The method of claim 9, further comprising the step of securing the base in place by a bench vice that engages with a plurality of flat sections of the base.

13. The method of claim 9, wherein the top comprises a tapered cone.

14. The method of claim 13, further comprising the steps of:
resting the wheel hub on the tapered cone; and
rotating the tapered cone and the wheel hub relative to the base.

15. The method of claim 14, further comprising the steps of:
rotating the tapered cone and wheel hub relative to the base; and
heating an inner race of the wheel hub evenly.

16. The method of claim 9, wherein the bearing is a 608 style roller bearing.

17. A tool for separating a first piece of a wheel hub from a second piece of the wheel hub comprising:
a base;
a shaft extending from the base;
a bearing having an outer wall and an interior opening, where the shaft extends through the interior opening;
a top having a base with a bottom opening formed therein, where the bearing fits within the bottom opening;
wherein the top is rotatably connected to the base about the bearing.

18. The tool of claim 17, wherein at least a portion of a piece of equipment engages with the top;
wherein the piece of equipment is rotated relative to the base; and
wherein the piece of equipment is separated into a first piece and a second piece.

19. The tool of claim 18, wherein a heat source is applied to the portion of the wheel hub when the piece of equipment and the top are rotated about the base to separate the first wheel hub piece from the second wheel hub piece.

20. The tool of claim 19, wherein one of the first piece and the second piece are an inner race of the wheel hub; and
wherein the inner race is heated evenly while the top and the piece of equipment are rotated relative to the base.

* * * * *